(12) United States Patent
Recce

(10) Patent No.: US 6,563,940 B2
(45) Date of Patent: May 13, 2003

(54) UNAUTHORIZED USER PREVENTION DEVICE AND METHOD

(75) Inventor: Michael Recce, South Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/858,682

(22) Filed: May 16, 2001

(65) Prior Publication Data

US 2002/0170220 A1 Nov. 21, 2002

(51) Int. Cl.$^7$ ................................................. G06K 9/00
(52) U.S. Cl. ...................................... 382/120; 42/70.01
(58) Field of Search .............................. 382/100, 115, 382/116, 120, 218, 126; 70/276; 434/21, 11; 42/84, 70.11, 70.01

(56) References Cited

U.S. PATENT DOCUMENTS

| | | | |
|---|---|---|---|
| 3,939,679 A | 2/1976 | Barker et al. ................. 70/277 |
| 4,003,152 A | 1/1977 | Barker et al. ............... 42/70 R |
| 4,067,132 A | 1/1978 | Smith ............................ 42/66 |
| 4,105,885 A | 8/1978 | Orenstein ................. 200/52 R |
| 4,135,320 A | 1/1979 | Smith ......................... 42/70 R |
| 4,141,166 A | 2/1979 | Schultz ....................... 42/70 B |
| 4,154,014 A | 5/1979 | Smith ......................... 42/70 R |
| 4,457,091 A | 7/1984 | Wallerstein ................. 42/1 LP |
| 4,467,545 A | 8/1984 | Shaw, Jr. .................... 42/70 R |
| 4,488,370 A | 12/1984 | Lemelson ................... 42/70 R |
| 4,563,827 A | 1/1986 | Heltsel ....................... 42/70 R |
| 4,682,435 A | 7/1987 | Heltzel ...................... 42/70.01 |
| 4,970,819 A | 11/1990 | Mayhak .................... 42/70.01 |
| 5,316,479 A | 5/1994 | Wong et al. ................. 434/11 |
| 5,603,179 A | 2/1997 | Adams ...................... 42/70.08 |
| 6,185,852 B1 | 2/2001 | Whalen et al. ............ 42/70.11 |
| 6,360,468 B1 | 3/2002 | Constant et al. .......... 42/70.01 |

Primary Examiner—Jayanti K. Patel
(74) Attorney, Agent, or Firm—Klauber & Jackson

(57) ABSTRACT

An unauthorized user prevention device and method prevents unauthorized users from operating a devices such as firearms or other types of weapons, and can also prevent access as an anti-theft device for vehicles and doors to buildings. A users initially grips a handle containing pressure sensors, and a pressure signature profile is stored that is based on hand position of the user's handgrip on the particular device as indicated by a change in pressure, pressure as a function of position on the particular device; and pressure as a function of time. A comparator compiles the pressure signature profile and compares it with profiles is storage to determined whether a match exists. Upon finding a match, a control unit releases an interlocking unit to enable the user to operate the device because he/she is authorized.

29 Claims, 9 Drawing Sheets

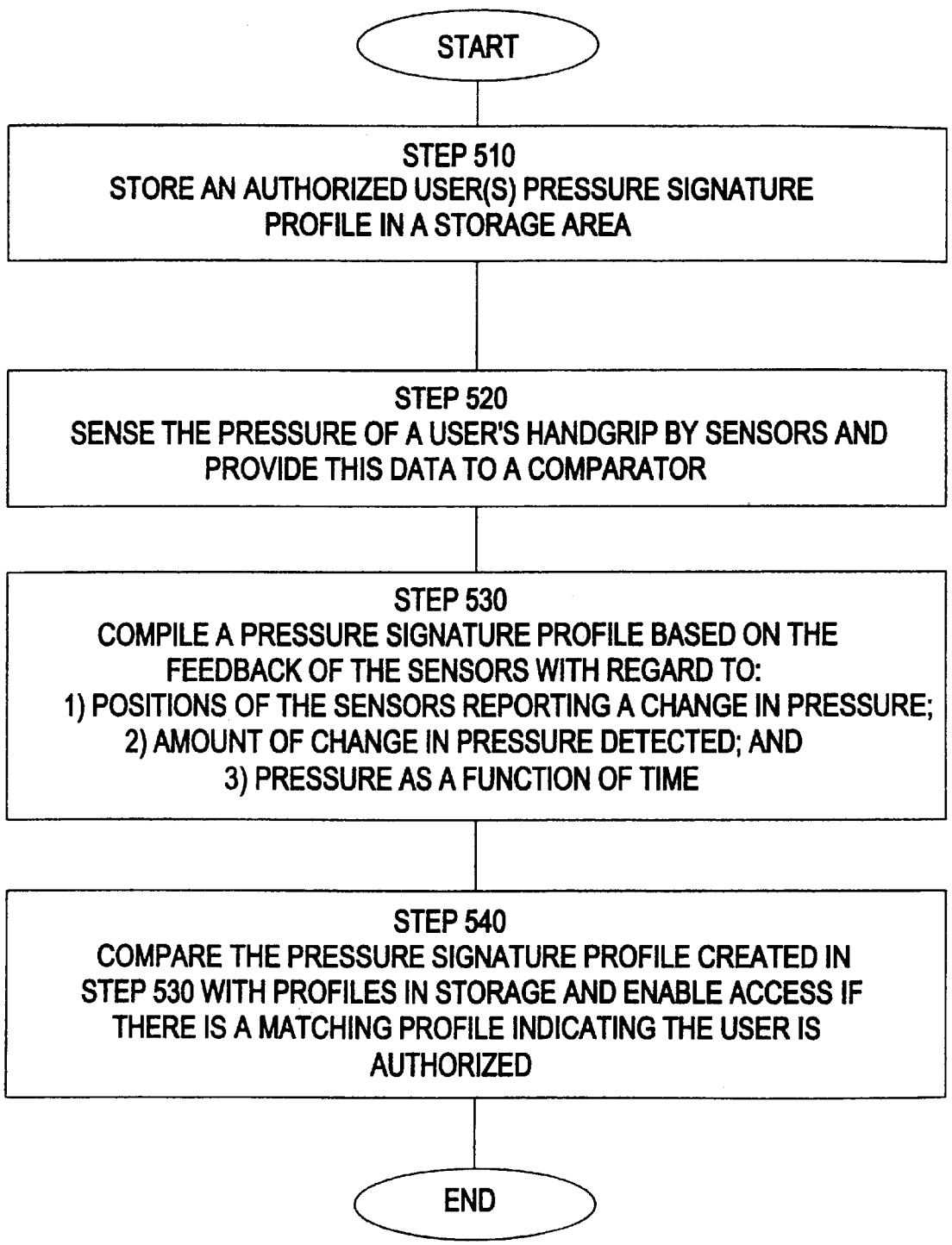

UNAUTHORIZED USER PREVENTION DEVICE AND METHOD

BACKGROUND OF THE INVENTION

1. Field of the Invention

The present invention relations to unauthorized user prevention devices and methods. More particularly, the present invention relates to an identification device and method to prevent the discharge of a weapon by anyone other than an owner and/or registered user.

2. Description of the Related Art

All too often there are tragic news reports of people who are gravely injured or killed by gunshots fired by a person who is not the owner or an authorized user of the firearm. Some of these tragedies are accidental, such as when a child finds a parent's firearm and accidentally discharges it at his/herself or at friends. Other tragedies concern firearms, which are taken during burglaries, which are subsequently, used in future robberies and/or homicides. On more than one occasion, a perpetrator has been known to wrestle the gun from an officer's holster and use it against the officer.

Regardless of the specific cause, it is evident that many of these incidents could be avoided if the firearm were only fireable by the owner or other authorized user of the gun. In fact, there is in fact a current effort by citizens and lawmakers to require the inclusion of trigger locks on handguns.

U.S. Pat. No. 4,970,819 to Mayhak discloses a system for sensing the grip pattern of the hand of a potential user of a firearm and permits the firing thereof if it senses a particular grip pattern of an authorized user which it has been programmed to recognize. The system includes grip pattern sensing means on the handgrip of the firearm, a simulated neural network memory capable of recognizing a particular grip pattern and a microprocessor for accessing the neural network to inquire whether it recognizes the grip pattern being sensed by the sensing means. The microprocessor also controls means for permitting and preventing actuation of the firing mechanism of the firearm to allow the firearm to be discharged only when the grip pattern sensed by the sensing means is that of the authorized user which the simulated neural network memory has been programmed to recognize.

According to the '819 patent, "a simulated neural network does not possess a memory in the sense that a computer has a memory. Instead, the training of a pattern recognition neural network involves repeatedly subjecting its input neurons to signals corresponding to the pattern, including variations thereof. This establishes interconnections between the input neurons, the hidden neurons and the output neuron, so that, eventually, when the trained network is subjected to a pattern signal the output is either "yes" or "no" that it is or is not the pattern it has been trained to recognize. A trained neural network will exhibit a particular pattern of interconnections between neurons therein and the pattern of connection strengths between neurons is equivalent to memory for that network" (col. 3 lines 34–48 of the '819 patent).

Furthermore, according to the '819 disclosure, "Artificial neural networks mimic behavior of the brain in that they can be taught to recognize and distinguish between different patterns and shapes. Once the neural network has been trained to recognize a particular pattern, it can do so even though it later is presented with small variations or incomplete information about that pattern. The neural network is thus ideally suited for recognizing a particular handgrip pattern impressed on sensing means 23 even though the authorized user may place his hand in a slightly different location or apply slightly different pressures with each grip. The neural network can be trained to take such variations into account and still distinguish the grip pattern for which it is programmed from grip patterns created by others who are not authorized to use the firearm" (from col. 3 lines 11–26 of the '819 patent).

U.S. Pat. No. 5,603,179 discloses a "safety mechanism for a firearm consisting of a specialized scanning mechanism built into the firearm's trigger. The scanner is programmed to read the unique fingerprints of a given individual. The device is also capable of holding the programmed print information for more than one person, so that multiple people would he able to use the firearm. However, usage is limited to only those persons whose handprints have been prestored in the scanner. The scanner mechanism is connected to the firearm's safety lock. The safety is prevented from being released without proper authorization from the scanner. When a person grips the weapon and places his finger on the trigger, the pressure of the finger on the trigger activates the scanner, and the scanner reads the fingerprint to determine if the scanned fingerprint matches one of the pre-stored fingerprint images. If the individual is an authorized user, the scanner transmits a signal to the safety, releasing this device and activating the firearm for use" (from abstract of the '179 patent).

U.S. Pat. No. 5,316,479 to Wong discloses a firearm training system, "which allows the measurement and display as a function of time of the hand grip force pattern applied to the grip of a firearm by a weapon hand of a shooter. This permits the detection of variations in the individual handgrip forces in the pattern during firing of the weapon. This firearm training system preferably also provides for the detection and display as a function of time of the position of the firearm trigger. The system includes separate force transducers for the side and front-to-back grip forces applied to the side surfaces and one of the front and back surfaces of the grip respectively as well as a trigger position sensor. A relative value of the hand grip forces detected by the transducers and a relative trigger position detected by the sensor are graphically displayed by the system as a function of time.

Wong discloses a method of training a shooter by determining the grip pattern of the shooter's weapon hand on a firearm by detecting a front-to-back grip force and a side grip force applied by the weapon hand and graphically displaying as a function of time a relative value of the front-to-back and side grip forces respectively. Thus, the system provides for a more effective training of a shooter, which substantially translates into cost savings in terms of training time and ammunition, especially since the firearm training system and method may effectively be used under both dry and live fire conditions" (See abstract of the '479 patent). The time period disclosed by Wong is relatively fixed, for example, 100 ms snapshot for each user training with the weapon. Wong provides feedback so that a shooter can see a "correct" way to hold the weapon and pull the trigger, as opposed to "incorrect" grips that could impair accuracy. Thus, Wong teaches a shooter how to conform to a predetermined method of holding and firing a weapon.

SUMMARY OF THE INVENTION

The present invention is directed to a weapon discharge protection system. This system comprises a safety feature that prohibits a firearm, such as a handgun, from being fired by anyone other than its owner or other authorized person. In one embodiment, pressure sensors are arranged within the handgrip of the firearm. When one attempts to fire the firearm, he or she exerts a unique pressure signature profile on the handgrip. That is, each person exerts a pressure signature profile that is comprised of (1) the position of the hand on the gun handle; (2) pressure as a function of position on the gun handle; and (3) pressure as a function of time. Pressure signature profiles are sufficiently distinctive as a means for differentiating the owner or other authorized person, whose pressure signature profile is stored in memory, from the remainder of the population-at-large. This signature profile is most differentiating during the half of a second just prior to the trigger pull, as the user prepares to fire the weapon. Initial data show that no more than 1% of the population-at-large possess a given pressure profile. In other words, there is a very low probability that a person who is not the owner or authorized user of a gun would be permitted to fire the gun because he or she matched the stored pressure signature profile.

In one embodiment, quartz crystals, arranged along the surface of the handle, are used as the pressure sensors. Quartz crystals are an attractive option because they are relatively inexpensive and commercially available. When biased these crystals, which are used in timepieces, oscillate at a fixed frequency, and pressure applied to the crystals result in repeatable, precise changes in this oscillation frequency. Sensor elements, such as quartz crystals offer long-term stability, high rigidity, and good strength, and provide a wide measurement range over a wide range of temperatures.

The electrical signals from the quartz crystals, which correspond to the pressure signature profile, or other sensor material, is inputted to a processing unit, such as a microprocessor. The signal could be the electrical signal generated by the pressure signature profile of the lawful owner or user, inputted to the processing unit for the first time. In this case, by entering a sequence of commands, the signal will be stored within the processing unit as the pressure signature profile of the owner or authorized user. On the other hand, the signal generated by the pressure signature profile could be that of a person who is attempting to fire the firearm, in which case the electrical signal outputted from the crystals to the processing unit is compared to the signal stored as pressure signature profile of the owner or authorized user. If the signal matches the signal stored as pressure signal profile, then the processing unit activates a mechanism that allows the owner or authorized user to fire the firearm. If the signal outputted from the crystals does not match the signal stored on the pressure signal profile, then the processing unit does not activate the mechanism, so that the firearm cannot be fired.

According to a first aspect of the invention, an unauthorized user prevention apparatus for preventing unauthorized users from operating a particular device comprises
  an interlocking unit for deactivating the particular device;
  a plurality of pressure sensors for sensing a user's handgrip on the particular device;
  a comparator unit for comparing a pressure signature profile compiled from an output from said pressure sensors with at least one pressure signature profile in storage, wherein the at least one pressure signature comprises:
  1) hand position of the user's handgrip on the particular device as indicated by a change in pressure on at least one of the plurality of the pressure sensors;
  2) pressure as a function of position on the particular device; and
  3) pressure as a function of time;
  a control unit/cpu for receiving an output from the comparator unit indicating that the signature profile compiled by the comparator unit matches said at least one pressure signature profile in storage,
  wherein the control unit/cpu releases the interlocking unit upon receipt of a signal from the comparator that the pressure signature profile of the user's handgrip on the particular device matches at least one pressure signature profile in storage.

In an embodiment, the particular device comprises a firearm, the interlocking unit comprises one of a latch unit and a push button safety unit; and the pressure sensors are arranged at least in a handle of the firearm.

The latch unit may comprises a solenoid, a latch, and a spring that biases the latch.

The latch unit can be arranged substantially inside the firearm, or on an exterior of the firearm. The latch can be biased to hold an existing safety of the firearm in a locked position.

In addition, latch unit may also unlock the existing safety of the firearm when the control unit/cpu releases the latch unit from the biased locked position.

In another aspect of the invention, the push button safety unit blocks movement of the safety button to release a trigger lock.

The pressure sensors can be adjacent an exterior surface of the particular device, and particularly arranged adjacent an exterior surface of a handle of the firearm.

In another aspect of the present invention, the sensors can be embedded in a cover which is arranged on at least a portion of an exterior surface of the particular device, such as a firearm.

There may be sensors additionally embedded in the trigger of the firearm. A fingerprint detection system of the prior art could be used in conjunction with the present invention as well.

According to another aspect of the invention, the sensors comprise a piezoelectric material, or they can be acoustic resonators.

The sensors may also comprise one of pressure strain gauges and micro-machined pressure sensors (MEMS).

In yet another aspect of the present invention, the particular device is a vehicle;
  the interlocking unit comprises one of an ignition cut-off and a fuel cut-off unit; and
  the sensors are arranged in a passenger compartment of the vehicle. For example, the sensors can be arranged to detect a user's handgrip on a steering wheel, a dashboard, a gearshift knob, and/or a door handle.

In addition, the sensors can be embedded in a cover arranged on the steering wheel.

In yet another aspect of the present invention,
  the particular device is a door handle;
  the sensors are arranged to detect a user's handgrip on the door handle; and
  the interlocking unit releases a door lock when the pressure signature profile of a user's handgrip matches a profile in storage.

In all of the above, comparator unit may count a number of attempts for authorization and disables the particular device after a predetermined threshold of successive non-matching pressure signature profiles have been compared.

In still another aspect of the present invention, the comparator unit counts a number of attempts for authorization and activates an alarm system after a predetermined threshold of successive non-matching pressure signature profiles have been compared.

A system for generating a pressure signature profile and comparing the pressure signature profile to a further pressure signature profile, which system can be used as a component of a handgun safety lock, the system comprises a pressure actuated generator of electrical signals produced in response to applied pressure, applied pressure as a function of area, and applied pressure as a function of time;

a processing unit electrically connected to the generator, the processing unit having a processor for developing a pressure signature profile from the electrical signals; storage for storing at least one pressure signature profile; and a comparator for comparing the stored pressure signature profile to a further pressure signature profile.

Finally, a method for generating a pressure signature profile and comparing the pressure signature profile to a further pressure signature profile comprises the steps of:

(a) storing an authorized user's pressure signature profile in a storage area;

(b) sensing the pressure of a user's handgrip by pressure sensors and providing pressure to a comparator;

(c) compiling a pressure signature profile by the comparator based on the pressure sensed in step (b) with regard to: 1) positions of the sensors reporting a change in pressure, 2) an amount of change in pressure detected, and 3) pressure as a function of time;

(d) comparing the pressure signature profile compiled in step (c) with the pressure signature profile stored in step (a) to determine whether there is a matching profile;

(e) enabling access to a device if the comparison in step (d) matches to indicate a user is authorized.

Step (d) of the above method may include (i) maintaining a count of successive non-matching pressure signature profiles, and (ii) disabling the device if a number of successive non-matching reaches a predetermined threshold.

Step (b) of the above method may include (i) generating electrical signals from a source that generates electrical signals in response to applied pressure, applied pressure as a function of area, and applied pressure as a function of time.

Step (b) of the above method may also include sensing the pressure signature profile of a user's handgrip on a handle of a firearm, a vehicle, or a door handle.

BRIEF DESCRIPTION OF THE DRAWINGS

FIG. 5 is a flowchart illustrating a method for unauthorized user prevention according to the present invention.

DETAILED DESCRIPTION OF THE PREFERRED EMBODIMENTS

It should be noted that the following description and drawings are for purposes of illustration, not limitation. For example, the weapon prevention device is not limited to a handgun, and could also be used with a rifle or shotgun. In addition, the present invention is not limited to firearms or even devices that propel projectiles. For example, taser guns, acoustic wave weapons, laser weapons would be within the spirit of the invention and the scope of the appended claims. In addition, virtually any handheld or hand controlled device that a user must grip could be used for the prevention of unauthorized access, and there is no requirement that such device must primarily comprise a weapon. For example, the invention could also be used as an anti-theft device in automobiles where the authorized user(s) grip on the steering wheel could be recognized as a signature, which overrides an ignition or fuel cutoff switch.

Finally, it is noted that U.S. Pat. Nos. (1) 6,185,851 B1, (2) 5,316,479, (3) 5,603,179, and (4) 4,870,819 are hereby incorporated by reference as disclosing background material regarding safety locks, trigger locks, and electronic/electromechanical pressure detection system known in the prior art.

Figure 1:
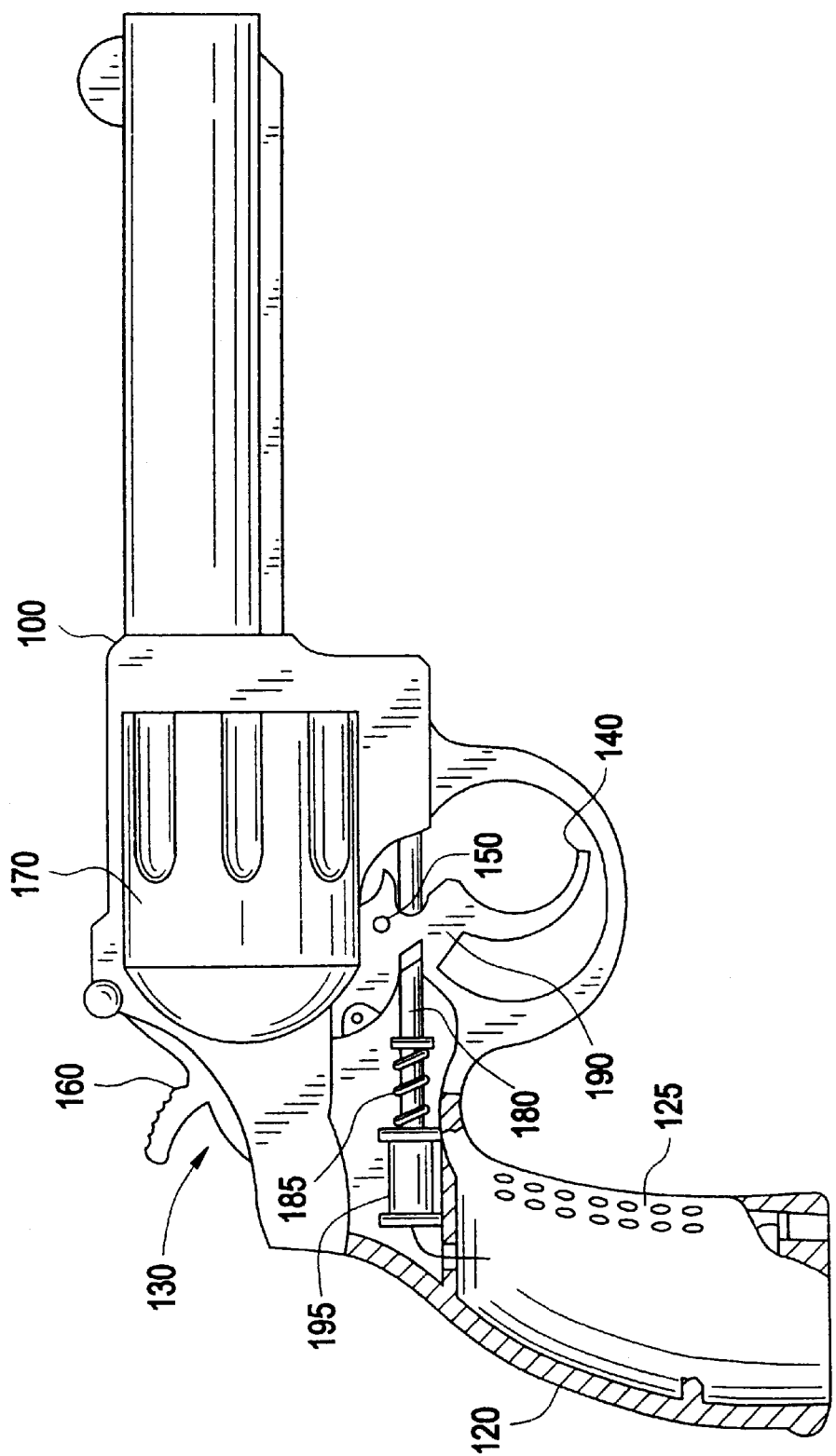
FIG. 1 is an elevational view of a firearm of an embodiment of the present invention.

FIG. 1 shows a firearm 100, which in this particular example is a handgun having a revolver design. The firearm is provided with a handgrip 120 and is fired when firing mechanism 130 is actuated. The firing mechanism 130 includes trigger 140, which is pivotally mounted in the frame of the gun at 150. Movement of the trigger 140 will cause a hammer 160 to be cocked and released, thus firing a bullet (not shown) stored in the cylinder 170.

The firearm 100 is provided with equipped with a safety, which is moved in and out of position to prevent and permit the actuation of the firing mechanism 130. As shown here, the safety is a sliding latch member 180 adapted to engage a portion 190 on trigger 140, which extends under the latch member 180. Latch member 180 is biased by a spring 185 to a position in which it is it is adjacent to portion 190, thereby preventing trigger 140 from being pulled, in which case it pivots around pivot 150 into the fired position. In effect, latch member 180 prevents actuation of the firing mechanism. This handgun is further provided with a solenoid 195 into which an end of latch member 180 is placed. When energized, solenoid retracts latch member 180, overcoming biasing force of spring 185, which removes the latch member 180 from the path of portion 190. With latch member 180 out of the path of portion 190, the trigger can be pulled, actuating the firing mechanism to discharge the firearm. The retraction of the solenoid, or any type of interlock system, is dependent upon recognition of the users as being authorized to use the weapon.

Figure 2:
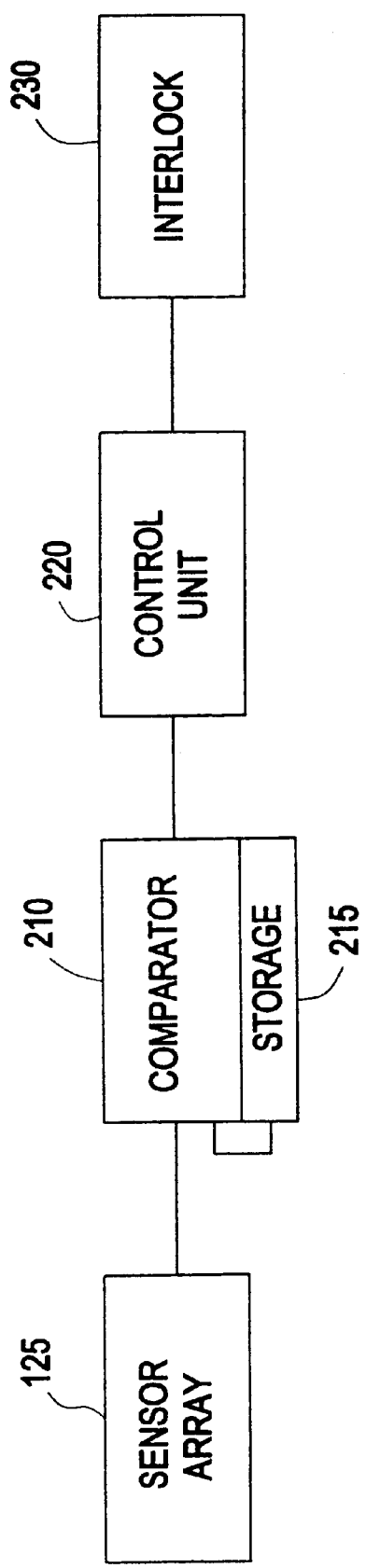
FIG. 2 illustrates a block diagram of the device according to the present invention.

FIG. 2 provides a block diagram of illustrating how the unauthorized user device of the present invention can operate. Sensor array 125, which is arranged in the handle of the weapon and may also be arranged in the trigger, or are part of a special retrofit grip for weapons made prior to the present invention, provide feedback information regarding the position, pressure, and duration of a person gripping the handle of the weapon. For all of the discussion in this application, the term "handgrip" is defined as the grip applied to the handle of a device (presumably but not necessarily limited to a weapon) that may also include the pressure asserted on the trigger as well as the pressure asserted on the handle of the weapon. The output from the sensors is provided to comparator 210, which compares these values with values previously stored in storage member 215.

When the comparator 210 finds a match (according to a predetermined variation either built into the device or chosen by user according to a sensitivity switch (not shown)) of the output with a value in storage, the comparator indicates this match to the control unit 220. The indication that there is a match could be, for example, a logic 1 or a logic 0 that is received by the control unit. In turn, the control unit will signal release interlock 230 so that the weapon can be fired.

In the case of the example illustrated in FIG. 1, the control unit/cpu 220 would energize the solenoid 195 and retract the latch member 180. It is possible that the control unit (which may or may not be separate from the cpu) could be programmed to have a limited sequence in which the weapon could be used, and once that time has passed, the control unit would again lock the interlock 230 and prevent the firing of the weapon.

The control unit/cpu 220 processes the electrical signals to develop a pressure signal profile including:

1) hand position of the user's handgrip on the particular device as indicated by a change in pressure on the sensorarray/pressure sensors; and 2) pressure as a function of position on the gun handle; and 3) pressure as a function of time.

With regard to the three items disclosed above to develop a pressure signal profile, items 1 and 2 provide information regarding the area over which pressure is exerted by a given person, i.e.—the outline of the hand, the outline of the fingers (item 1) pressure on the handgrip, as manifested by the position of the hand on the handgrip, and any variances in the pressure applied by over the area (item 2). Item 3 shows pressure as a function of time, which is also critical because the duration that each person applies pressure by squeezing the grip varies greatly.

The pressure signature profile can permit a user to wear thin gloves and still be recognized as the authorized user, which would not be possible in fingerprint recognition systems of the prior art.

Together, the three elements of the profile (items 1–3) provide a unique pressure signal profile that no more than 1% of the population-at-large would possess. The sensors, including the piezoelectrics described above, produce a continuous analog output signal that varies in repeatable manner with applied load, and has a unique output for each level of applied pressure. The "pressure signature profile" is a composite signal that includes voltage changes, oscillation frequency changes, and frequency composition changes. The identification of an individual is performed using a statistical classifier that includes a set of computed weights and thresholds which separate the "pressure signature" of an individual from that of the rest of the population.

When a force is applied to the handgrip the sensors output an electrical signal to the control unit. In one embodiment the control unit may be a microprocessor located within the firearm, for example, within the handgrip. The control unit compares it to the signal stored as the pressure profile of the lawful owner or authorized user. The microprocessor simultaneously reads the signals from all of the sensors and continuously searches for the dynamic pattern corresponding to the valid "pressure signature." Components of the sensor signal are multiplied by the computed weights and stored thresholds are applied. If the signal exceeds these computed thresholds then the firearm is allowed to fire during predetermined time interval (e.g. 500 milliseconds).

Once the pressure signal profile has been identified as that of an authorized user, the decision as to how long such an authorized user would be allowed to use the device could be based on a number of factors that could be programmable according to an individual's preference. For example, police officers sometimes pull weapons at armed perpetrators and order them to freeze. Sometimes there can be a "standoff" where the police have a weapon pointed at a particular perpetrator, who is not putting down his weapon nor has his hands in the air, prior to being handcuffed. If the time permitted to fire the weapon is too short, the gun could reset and the police officers would be unable to defend against a subsequent attack by the perpetrator (or possible accomplices) until the gun was gripped again, or reactivated by pressing an "on" switch, etc. If the time is set for too long, the weapon could be wrestled from the authorized user and fired by an unauthorized user.

A Motion sensor (not shown) could also be included both to begin the process by activating the device, and after a certain period of time without any motion, to end it. Since a firearm is typically pointed down while in a holster, a predetermined tilt angle could be programmed in to activate the detection, or the mere squeezing of the grip while induce a voltage in the piezoeletric type sensors that could turn on the device. In the above embodiment, to insure that the handgun is fired only by the lawful owner or other authorized user, the handgrip 120 of the firearm 100 is provided under its surface with an array of sensors 125 that are provided on all four sides of the handgrip 120. However, while providing sensors on all four sides of the handgrip (and including a large number of them) will tend to allow a greater degree of sensitivity in terms of detection as to whether a user is authorized, there is not an absolute requirement that sensors must be arranged on all sides of the item being gripped, nor must the sensor total a particular number. In one aspect of the invention, a number of sensors (less than 20) are used in locations that maximally distinguish between subjects hand size and pressure patterns. In another aspect of the invention, a high density of pressure sensors are used to full and uniformly cover the grip area of the handgun, or item to be gripped, as the case may be.

In another embodiment, suitable sensors include a sensing element into which a piezoelectric element has been embedded. Suitable piezoelectric elements include quartz crystals. Other suitable piezoelectric materials including lead titinate and lead zirconate, could be used in either a crystalline or film form. The pressure signal could also be measured using strain gauges or micro-machined pressure sensors (MEMS).

Systems employing piezoelectric materials, such as the crystals described above, produce an electrical output when they experience a change in load, i.e., pressure. Making use of this phenomenon, an embodiment of the present invention includes the transmission of electrical signal from the sensors, in response to pressure applied when a person grips the handle of the firearm, to a control unit located within the firearm. A purpose-built electronic circuit is used to convert the voltage and frequency changes measured from the sensors into a digital signal read by the processor. An electrostrictive system could also be employed.

In addition, the sensors could comprise acoustic resonators, which sense the resonance properties in the pressure differential caused by the particular grip. Acoustic resonance is a known phenomenon exhibited by an acoustic system, in which the response of the system to sound waves becomes very large when the frequency of the sound approaches a natural vibration frequency of the air in the system.

This "pressure signature" signal is programmed into the handgun by an independent station that is held by the authority that registers handguns. Such authority, for example, could be a state or local entity, or even an authorized third party. The owner of the handgun fires the gun ten to twenty times, and the pressure patterns unique to that individual are computed by a purposely-built data acquisition and analysis system. It is protected from abuse by one of several possible mechanisms, including encryption of the stored signal and tamper detection systems that can completely disable the firearm.

Grip pattern signals from sensing means 125 are fed from the firearm 100 over a line 129 to the host computer. A jack 131 in the butt of firearm handgrip 120 permits line 129 to be connected to the firearm.

The pressure sensors and central processing unit/control unit within the handgun are powered by a power source, typically a battery system (not shown) that could be located in the ammunition clip of the handgun. This arrangment allows the battery to be recharged in empty ammunition clips that are not in use.

It is understood by persons of ordinary skill in the art that a power source could be arranged in any internal location of the weapon/device, such as in the handle. There could be a small external plate that may allow the gun to be recharged while either in a carrying case or holster. In a "wrap around" version, where the unauthorized user prevention device is fitted onto or around a handle of the weapon, the power source would be external to the weapon handle but would be at least partially covered by the wrap around material, that could be, for example, a flexibile material such as a plastic or a rubber.

Furthermore, in order to reduce the need to charge or replace batteries, there can be a motion sensor (not shown) arranged in or on the weapon, the motion sensor turning on the power only when the handgun is not stationary.

Figure 3:
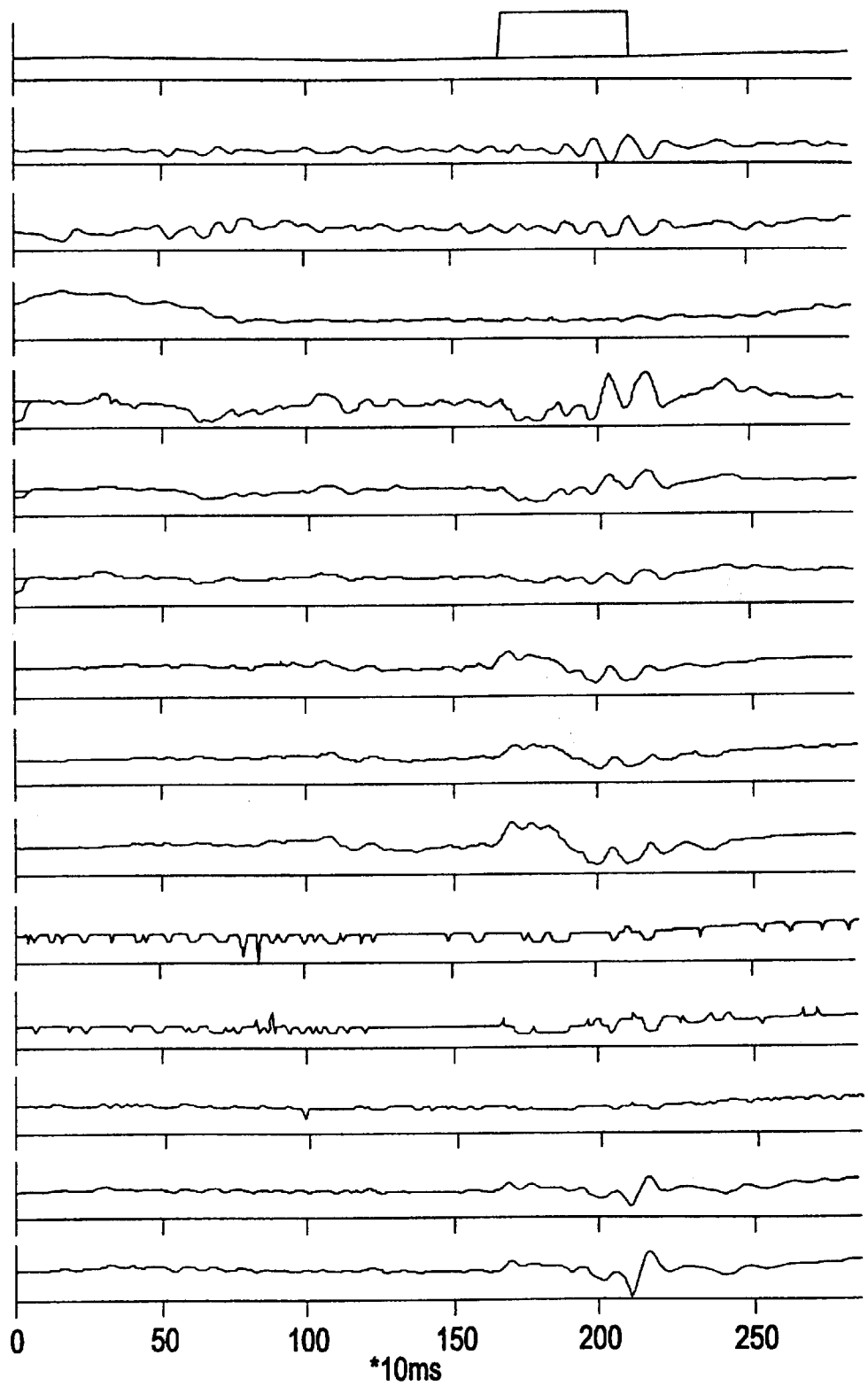
FIG. 3 illustrates a graph of the measured pressure versus time.

FIG. 3 shows a graph of pressure versus time. A person of ordinary skill in the art would know the values in p.s.i. or its metric equivalent for the given timeframe. On the Y axis are the separate pressure sensor and the X axis represents time. It can be seen at approximately 160 ms the several are indicating a change in pressure differential by the voltage change, which would occur when a user grips the handle and causes, for example, piezoelectric material to resonate at a particular frequency that causes a voltage change sensed by a comparator.

As previously disclosed, this detected grip may be from the pressure applied to the handle and may or may not include, the actual pulling of the trigger (to the extent it would be movable despite having an interlock preventing movement sufficient to fire the weapon. It is also within the spirit and scope of the invention that the trigger may contain pressure sensors as well, and the pressure signature profile would be the outputs of the sensors from the handle and on the trigger. In addition, when the user pulls on the trigger, that action could either activate the unauthorized prevention device to turn on/supply power to the control unit/cpu, etc. It should be noted that in such a system, once an identification is made while the user is squeezing the trigger, the interlock could be released and the weapon inadvertently fired by a user who only desired to make the gun capable of being fired, but did not necessarily intend to fire it as soon as it became capable. For example, a police officer could be pointing the weapon at a perpetrator, but not desiring to actually discharge the weapon unless further aggression or advancement is made by the perpetrator.

Accordingly, the desirability of having the unauthorized user device automatically retract a mechanical safety latch, or merely having the device remove constraints so that the authorized user may then physically push/pull or manually disengage the lock, are both achieved by the present invention. Presumably, the additional manual step of moving a safety after the unauthorized user prevention device has, for example, retracted a solenoid, would to some degree take more time before the authorized user could actually discharge the weapon. This type of system would also reduce the possibility of the accidental firing than a version which, for example, also automatically disengages the safety after detecting that the user is authorized.

As shown in FIG. 3, there are elevated levels of pressure sensed by the pressure sensors while pressure is applied. The duration of the grip, the duration of the elevated pressure levels, and the specific sensors which sense the elevated pressure are used in determining the pressure signature profile.

According to the present invention, a pressure signature profile is based on the above three items that are feed back to the control unit/cpu from the sensors. According to the present invention, persons applying the same amount of pressure but having a differently positioned grip, or applying pressure for a different duration of time (within predetermined criteria) would have a different pressure signature signal profiles than the example shown in FIG. 3. Accordingly, such a pressure signal profile would be compared against the profile(s) in storage to determine whether a user is authorized.

It is envisioned that only a limited number of attempts would be permitted before "locking out" the device until reset by a central controller. This would reduce the possibility of someone attempting to apply various positions and pressures until they stumble upon a successful outcome.

According to the present invention, even with a 1% chance of two people having the same pressure profile signature, the odds of a child having a pressure signature profile which matches that of an adult would be significantly less than 1%; in fact the odds would be nearly astronomical. A young child normally has a much smaller hand than the average adult (both length and girth of fingers and palm), so that the many of the pressure sensors experiencing a change in pressure when a child squeezes the handle would be not be the same as when an adult squeezes the handle, and a child would not normally have the same strength of grip as an adult. Factoring in the third item (time) with the other two items, the device would effectively prevent children from being able to fire the weapon. Finally, a limited number of retries would prevent a more mature child (i.e. teenager) from trying to figure out the pattern.

Figure 4A:
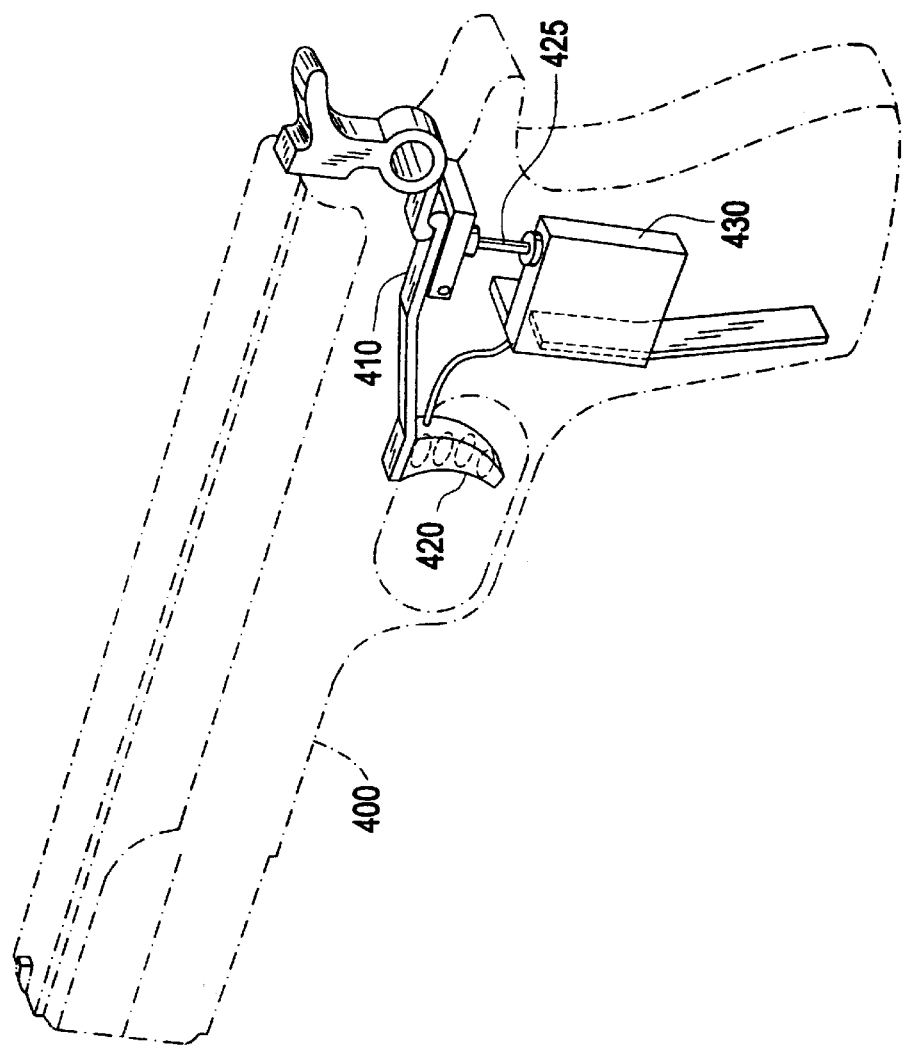
FIGS. 4A, 4B and 4C illustrate variations of the present invention where the unauthorized user prevention device is connected to several types of safety mechanisms used in semi-automatic weapons.

FIG. 4A shows one way that the present invention may work on a semi-automatic weapon 400, having an internal trigger lock 410. The trigger 420 would be prevented from movement by a safety latch 425, which is received in a through-hole of the trigger lock 410. On the opposite end, the latch extends from solenoid 430 and after a matching pressure profile is detected, the solenoid would retract the latch 425, thus permitting the trigger to be moved back toward the handle to fire the weapon.

The solenoid would be controlled by a control unit/cpu 440 similar to the description of the unauthorized user prevention device described for a revolver. The user's grip of the handle would be sensed in a similar manner as described above. A battery (not shown) could be in the ammunition clip or separately located in a compartment.

Further, the solenoid would remain extended in the case of a dead battery, so that if a child should inadvertently find a weapon stored somewhere in the house for a period of time where it was unattended or forgotten, there would be no possibility of firing the weapon. As a precaution for the authorized user, battery indicators (not shown), which are known in the art, are envisioned as an optional feature. The indicator might comprise a display and/or beep when the power is low (similar to some smoke detectors) to warn the authorized user of an impending deactivation of the weapon.

It should also be noted that in any of the above variations of the present invention, a solenoid is not the only way to extend/retract a latch, and any other suitable switching device could be employed. By way of illustration and not limitation, a motor, a relay, or any type of electro-mechanical switch could serve as a substitute for the solenoid. Reliability and a quick response time to activate/deactivate the switch are far more important than whether the switch is, for example, a solenoid.

Figure 4B:
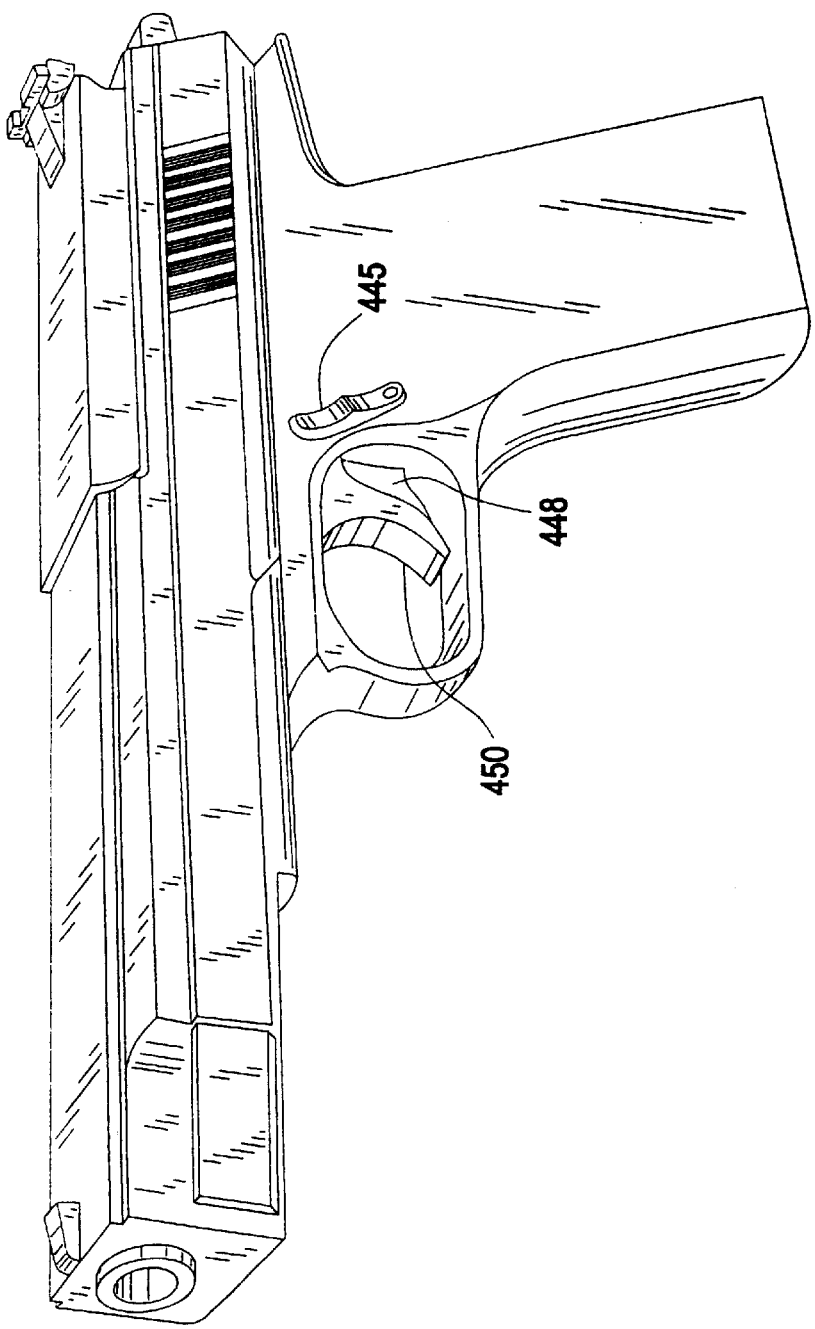

FIG. 4B shows a semi-automatic pistol 440 having an external safety latch 445 that is pivotable against the portion 448 of trigger 450 in a locked position so as to prevent the weapon from being fired. The user prevention device according to the present invention may use a any known device, such as a motor, magnet, spring loaded switch, relay or any electro-mechanical switch to move the external safety latch from the locked position against the portion 448 of the trigger to an unlocked position shown in FIG. 4B. The signal to move the safety latch would be from the control unit/cpu after detecting that the user is authorized.

A external system similar to U.S. Pat. No. 6,185,852 could also be used to prevent the latch from movement, except that instead of using a "blocking disk" which is a shield that covers the external access to the latch, a magnet can hold the safety latch in the locked position until a signal is received by the control unit after a user's pressure signature is a match.

Figure 4C:
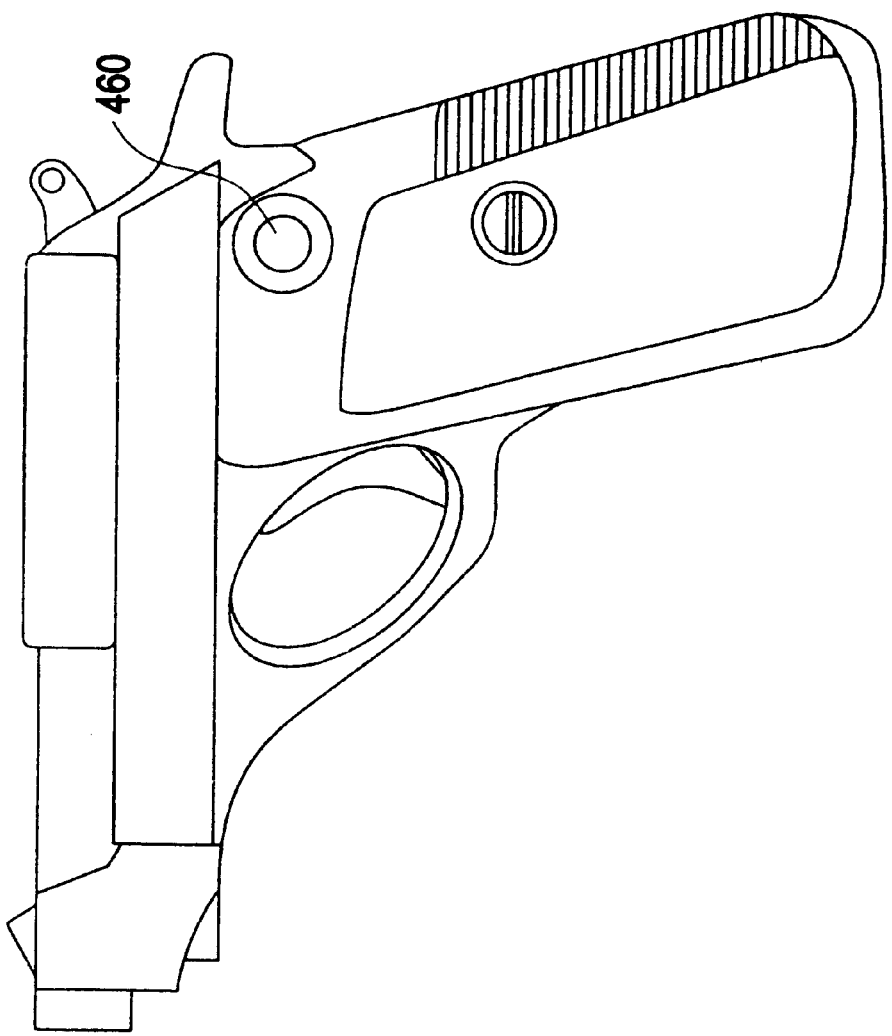

FIG. 4C shows a push-button type safety switch 460 that prevents the trigger from being activated. This type of switch can be blocked internally, by a rod/latch system connected to a solenoid, or any other type of electro-mechanical switch that in one position would prevent the switch from being moved to an unlocked position.

FIG. 5 is a flowchart illustrating the steps of a method for preventing an unauthorized user from operating a device.

At step 510, the storage of an authorized user's pressure signature profile based on (1) position of a user's hand on a handle of the device; (2) pressure as a function of position on the handle of the device; and (3) pressure as a function of time. While it is envisioned in this embodiment that the storage is in the device, it could be remotely stored, and even transmitted via RF to a central unit.

At step 520, there is sensing the pressure of a user gripping the handle of the device to compile a pressure signature based on the criteria recited in step 510.

At step 530, there is a comparing the pressure profile in step 520 with pressure profiles in storage.

At step 540, there is deactivating the safety interlock of the device if the comparison in step 530 finds a matching profile in storage.

Although not shown in FIG. 5, there is an optional step 525, which is a decision box which asks whether the number of previous non-matching attempts has exceeded a predetermined threshold. If the answer to step 525 is no, the flowchart would proceed to step 530. If the answer to step 525 is yes, the flowchart would proceed to a step parallel to step 540 (i.e. step 540B), which would permanently disable the weapon until reset by an authorized agent, such as a gun dealer, and/or state agency, etc. This version would also include an additional substep, which would be to update a counter if the user is unauthorized. This method will prevent an unauthorized user from trying to guess the pressure profile signature of an authorized user.

Figure 6:
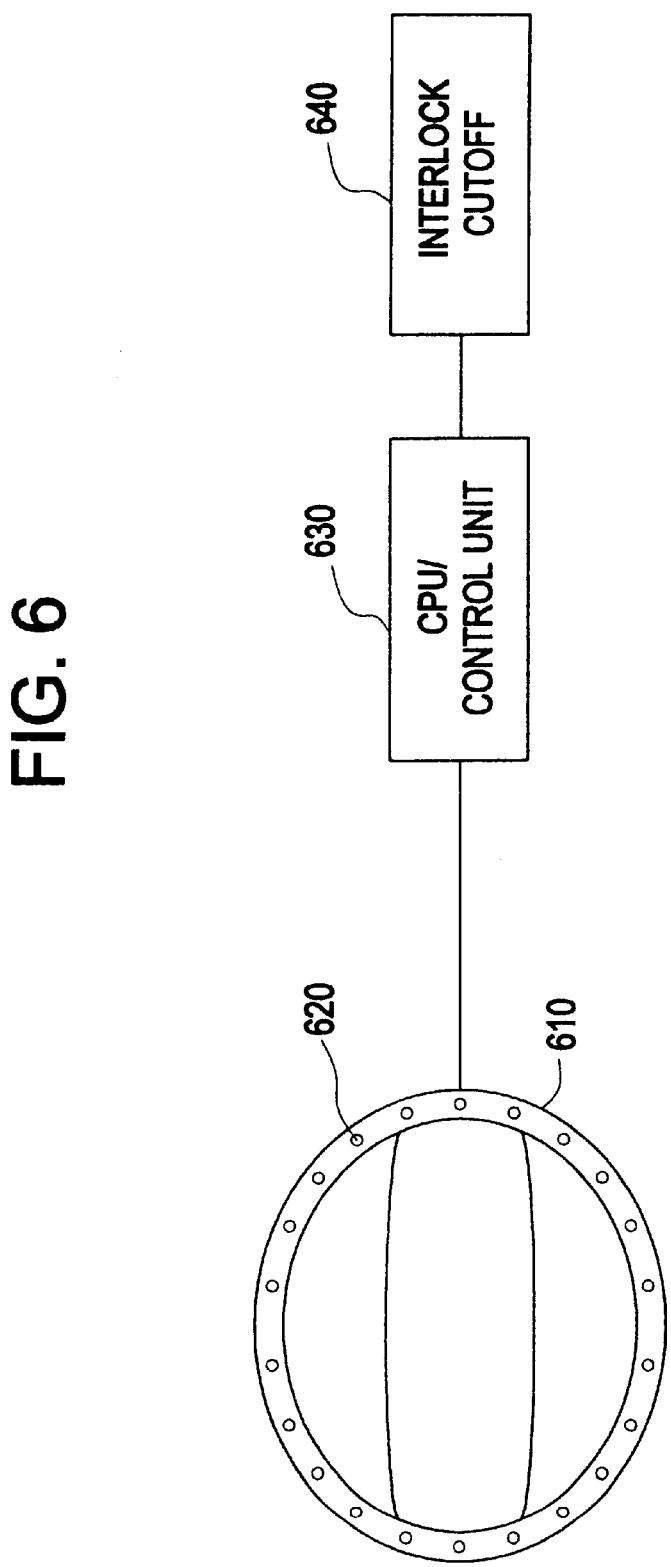
FIG. 6 illustrates an embodiment of the unauthorized user prevention device of the present invention used as an anti-theft device in an automobile.

FIG. 6 shows a different application of an authorized user prevention device according to the present invention. A Steering wheel 610 of a vehicle may either have sensors built in, or a steering wheel cover (not shown) could be attached over the steering wheel.

The unauthorized user prevention device could be located anywhere in the automobile, for example, in the steering column, under the dashboard, under the hood, in the trunk, etc. The device could be powered by the vehicle's battery. Similar to the pressure profile used for preventing unauthorized users from activating a weapon, a pressure profile from squeezing the steering wheel based on the three items (position, pressure and time) can be stored. There can be an ignition cutoff switch 620, fuel cutoff switch, etc. that would only be deactivated when the user squeezing the steering wheel matches a profile in storage, thus being an authorized user. The user could squeeze the wheel with a "secret handshake" (which can also be used with a weapon) that could be anywhere from just one finger to all ten. The number of possibilities, based on in part on the number of sensors and the number of combinations of fingers squeezing different areas at different pressure for different time periods would result in the chance of an unauthorized user gaining access as extremely remote being one in thousands or tens of thousands, as opposed to one in one hundred. A control unit or cpu 630 would compare the profiles and deactivate the interlock.

Figure 7:
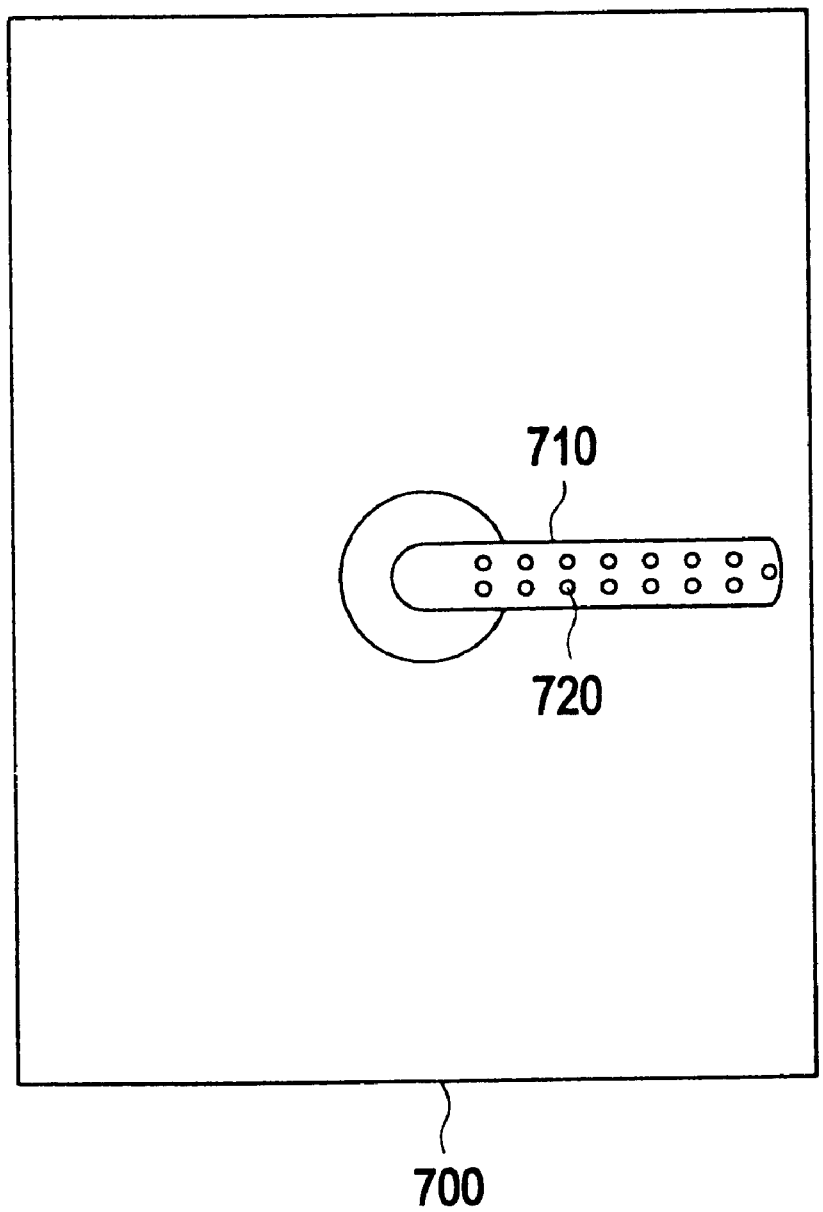
FIG. 7 illustrates an embodiment of the unauthorized user prevention device of the present invention used to permit keyless entry by a recognized grip of the door handle.

FIG. 7 also shows how the unauthorized user prevention device could work on a "keyless" door handle 710. A series of sensors 720 could be embedded in the door handle (it could also be a round knob (not shown) or a long handle (French style). Similar to the above device descriptions, the user gripping the door would create a pressure profile based on position, pressure and time. This profile could be compared with stored pressure profiles that would release the lock if the person gripping the door handle matches one of the profiles in storage. The cpu or control unit could be remotely located, and the sensor feedback could be transmitted to the control unit by wire, fiber optics, or RF.

Various modifications can be made to the above disclosure that would be within the spirit of the invention and the scope of the appended claims. For example, the unauthorized user prevention device has been shown for uses on handguns, but clearly can be used with rifles, shotguns, any projectile launching weapon, and even non-projectile type weapons. As also illustrated in FIGS. 6 and 7 and described above, the device and method can be used to prevent unauthorized access in vehicles, boats, or any apparatus having is a hand control that can be squeezed, such as a steering wheel, gearshift knob, joystick, throttle, brake handle etc. In fact, in a vehicle, the sensor could even be located in the dashboard or a door handle, and a user would simply squeeze a portion for access to start the engine.

I claim:

1. An unauthorized user prevention apparatus for preventing unauthorized users from operating a particular device, said system comprising:

an interlocking means for deactivating the particular device;

a plurality of pressure sensors for sensing a user's handgrip on the particular device;

comparator means for comparing a pressure signature profile compiled from an output from said pressure sensors with at least one pressure signature profile in storage, said at least one pressure signature comprising:

1) hand position of the user's handgrip on the particular device as indicated by a change in pressure on at least one of the plurality of the pressure sensors;

2) pressure as a function of position on the particular device; and 3) pressure as a function of time;

control unit/cpu means for receiving an output from said comparator means indicating that the signature profile compiled by said comparator means matches said at least one pressure signature profile in storage, wherein said control unit/cpu means releases said interlocking means upon receipt from said comparator means that the pressure signature profile of the user's handgrip on the particular device matches said at least one pressure signature profile in storage.

2. The apparatus according to claim 1, wherein:

the particular device comprises a firearm;

said interlocking means comprises one of a latch means and a push button safety means; and said pressure sensors are arranged at least in a handle of the firearm.

3. The apparatus according to claim 2, wherein said latch means comprises a solenoid, a latch, and a spring that biases the latch.

4. The apparatus according to claim 3, wherein said latch means is arranged substantially inside the firearm.

5. The apparatus according to claim 3, wherein said latch means is arranged substantially on an exterior of the firearm.

6. The apparatus according to claim 3, wherein the latch is biased to hold an existing safety of the firearm in a locked position.

7. The apparatus according to claim 6, wherein said latch means unlocks the existing safety of the firearm when the control unit/cpu releases the latch means from the biased locked position.

8. The apparatus according to claim 2, wherein the push button safety means comprises means for blocking movement of the safety button to release a trigger lock.

9. The apparatus according to claim 2, wherein said sensors are adjacent an exterior surface of a handle of the firearm.

10. The apparatus according to claim 2, wherein said sensors are embedded in a grip which is arranged on at least a portion of the handle of the firearm.

11. The apparatus according to claim 2, wherein said sensors are additionally embedded in the trigger of the firearm.

12. The apparatus according to claim 2, wherein said sensors comprise a piezoelectric material.

13. The apparatus according to claim 2, wherein said sensors comprise acoustic resonators.

14. The apparatus according to claim 2, wherein said sensors comprise one of pressure strain gauges and micromachined pressure sensors (MEMS).

15. The apparatus according to claim 2, wherein said comparator means counts a number of attempts for authorization and disables said apparatus after a predetermined threshold of successive non-matching pressure signature profiles have been compared.

16. The apparatus according to claim 1, wherein said sensors are adjacent an exterior surface of the particular device.

17. The apparatus according to claim 1, wherein said sensors are embedded in a cover which is arranged on at least a portion of an exterior surface of the particular device.

18. The apparatus according to claim 1, wherein said sensors comprise a piezoelectric material.

19. The apparatus according to claim 1, wherein said sensors comprise acoustic resonators.

20. The apparatus according to claim 1, wherein said sensors comprise one of pressure strain gauges and micromachined pressure sensors (MEMS).

21. The apparatus according to claim 1, wherein said comparator means counts a number of attempts for authorization and disables said apparatus after a predetermined threshold of successive non-matching pressure signature profiles have been compared.

22. The apparatus according to claim 1, wherein said comparator means counts a number of attempts for authorization and disables said apparatus after a predetermined threshold of successive non-matching pressure signature profiles have been compared.

23. A system for generating a pressure signature profile and comparing the pressure signature profile to a further pressure signature profile, which system can be used as a component of a handgun safety lock, the system being comprised of:

a pressure actuated generator of electrical signals produced in response to applied pressure, applied pressure as a function of area, and applied pressure as a function of time;

a processing unit electrically connected to the generator, the processing unit having a processor for developing a pressure signature profile from the electrical signals;

storage for storing at least one pressure signature profile; and a comparator for comparing the stored pressure signature profile to a further pressure signature profile.

24. A firearm incorporating the system of claim 23 wherein the sensors are located on the handgrip of the firearm and an actuator for locking a trigger of the firearm, the actuator being electrically connected to the processing unit.

25. The system of claim 23 wherein the sensors are quartz crystals & other piezoelectric elements.

26. A method for generating a pressure signature profile and comparing the pressure signature profile to a further pressure signature profile, of a firearm device said method comprising the steps of:

(a) storing an authorized user's pressure signature profile in a storage area;

(b) sensing the pressure of a user's handgrip by pressure sensors and providing pressure to a comparator;

(c) compiling a pressure signature profile by said comparator based on the pressure sensed in step (b) with regard to: 1) positions of the sensors reporting a change in pressure, 2) an amount of change in pressure detected, and 3) pressure as a function of time;

(d) comparing the pressure signature profile compiled in step (c) with the pressure, signature profile stored in step (a) to determine whether there is a matching profile;

(e) enabling access to a device if the comparison in step (d) matches to indicate that a user is authorized.

27. The method according to claim 26, wherein step (d) includes (i) maintaining a count of successive non-matching pressure signature profiles, and (ii) disabling a particular device if a number of successive non-matching reaches a predetermined threshold.

28. The method according to claim 26, wherein step (b) includes (i) generating electrical signals from a source that generates electrical signals in response to applied pressure, applied pressure as a function of area, and applied pressure as a function of time.

29. The method according to claim 26, wherein step (b) includes sensing the pressure of a user's handgrip on a handle of a firearm.

* * * * *